United States Patent [19]

Visser et al.

[11] Patent Number: 5,787,087

[45] Date of Patent: Jul. 28, 1998

[54] METHOD AND APPARATUS FOR INTERCONNECTING A PLURALITY OF TERMINAL EQUIPMENTS TO THE ISDN

[76] Inventors: John A. Visser, 46 Chapman Rd., Wakefield, Mass. 01880; Paul E. Nikolich, 18 Bishops La., Lynnfield, Mass. 01940

[21] Appl. No.: 541,054

[22] Filed: Oct. 11, 1995

[51] Int. Cl.$^6$ ............................................. H04L 12/66
[52] U.S. Cl. ............................ 370/420; 370/463; 370/465
[58] Field of Search ................................ 370/465, 466, 370/467, 522, 904, 463, 401, 420; 379/399

[56] References Cited

U.S. PATENT DOCUMENTS

| | | | |
|---|---|---|---|
| 4,592,047 | 5/1986 | Fundneider | 370/420 |
| 4,905,237 | 2/1990 | Voelzke | 370/359 |
| 4,970,723 | 11/1990 | Lin | 370/359 |
| 5,204,860 | 4/1993 | Sparks | 370/463 |
| 5,305,312 | 4/1994 | Fornek et al. | 370/264 |
| 5,442,630 | 8/1995 | Gagliardi et al. | 370/402 |
| 5,444,703 | 8/1995 | Gagliardi et al. | 370/402 |
| 5,450,396 | 9/1995 | Havermans | 370/385 |
| 5,479,407 | 12/1995 | Ko et al. | 370/231 |

*Primary Examiner*—Chi H. Pham
*Assistant Examiner*—Ricky Ngo
*Attorney, Agent, or Firm*—Pedro P. Hernandez

[57] ABSTRACT

An interface port expansion device (302) allows for more than one terminal equipment (304, 306, 308 and 310) having embedded U-interface termination's to interface to the ISDN via the U interface. The port expansion device (302) can take the form of a separate stand-alone device or a circuit which is integrated into a terminal apparatus. The port expansion device (302) includes a plurality of local (secondary) U interface ports (314, 316, 318 and 324) for interconnecting the terminal equipment (304, 306, 308 and 310) and a network side U interface (312) for interconnection to the ISDN. In other aspects of the invention, methods for allowing a plurality of terminal equipment having embedded U-interface terminations to receive messages from and transmit messages to the Integrated Services Digital Network (ISDN) via a single network side U-interface are described.

19 Claims, 9 Drawing Sheets

METHOD AND APPARATUS FOR INTERCONNECTING A PLURALITY OF TERMINAL EQUIPMENTS TO THE ISDN

FIELD OF THE INVENTION

This invention relates in general to the field of data communications, and more particularly, to a method and apparatus for interconnecting a plurality of terminal equipment to the Integrated Services Digital Network (ISDN).

BACKGROUND OF THE INVENTION

ISDN provides for the transmission of data and voice signals using a communication channel having a bit rate, of for example, 64 kbit/second. This communication channel interconnects the central office (CO) equipment and the ISDN subscriber's premises and takes the form of a two-wire line. In the United States, ISDN Basic Rate Interface (BRI) service is provided via the network "U interface" at the subscriber's network termination apparatus (NT). Basic rate service in the United States comprises two 64 kBit/second "B" channels, for transmitting voice, data, video, etc. and one 16 kBit/second "D" channel for transmitting signaling data or packet-switching. This is why ISDN is also commonly referred to as "2B+D" access in the United States.

The U interface is specified in the American National Standard for Telecommunication publication entitled, "Integrated Services Digital Network (ISDN)—Basic Access Interface for use on Metallic Loops for Application on the Network side of the NT (LAYER 1 Specification)", also known as ANSI T1.601. The ANSI T1.601 specification describes the physical interface between the Exchange Termination (ET), or network side (central office) of the local loop 102, and the Network Termination (NT) 104, or terminal equipment side of the local loop, which is located at the subscribers premises.

Figure 1:
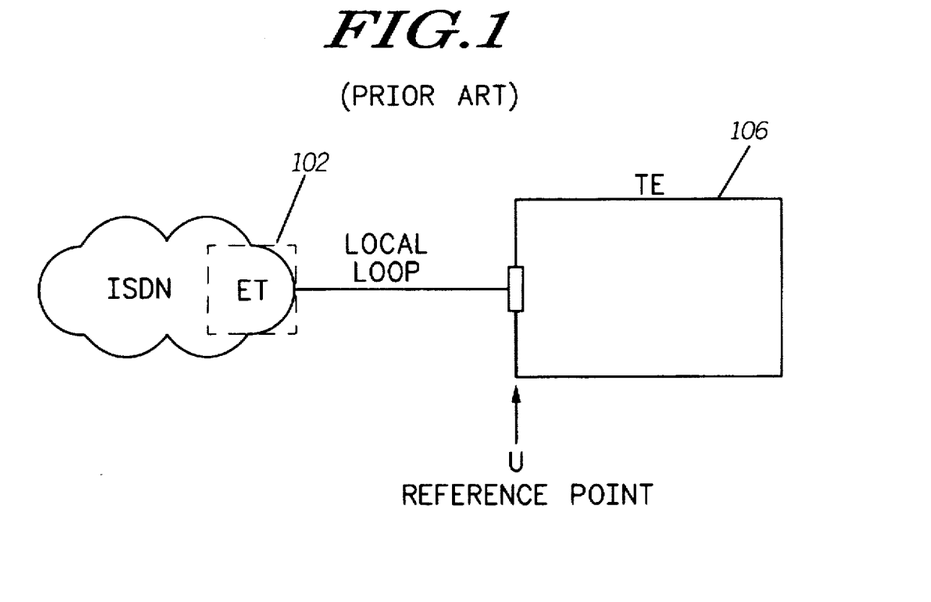
FIG. 1 shows a prior art terminal equipment having an embedded U-interface termination coupled to the ISDN via the U interface.

The U interface is a two-wire line that provides point to point communication only. That is, only one device 106 having an embedded U interface termination 104 may be attached at each end. If the terminal equipment 106 is provided with an embedded U interface connection 104 and is connected to the line, no additional terminals may be connected as shown in FIG. 1.

Figure 2:
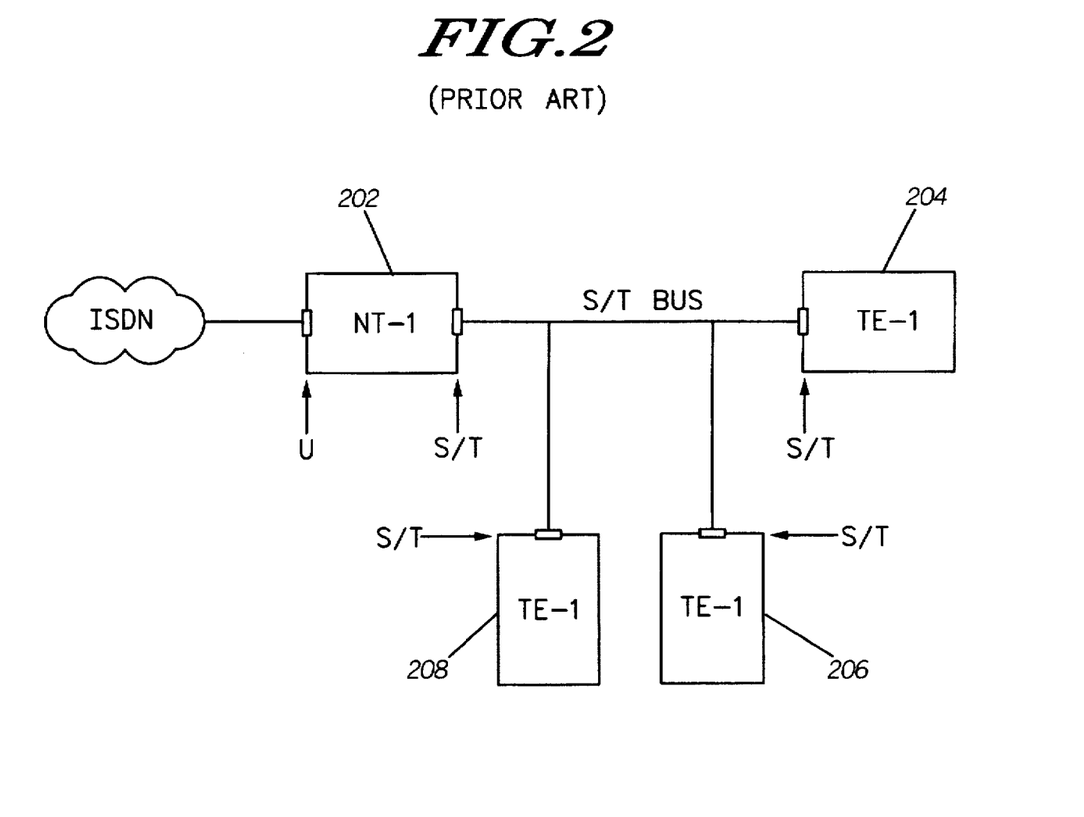
FIG. 2 shows a plurality of terminal equipment connected to the ISDN using a device which performs the NT-1 function as known in the prior art.

Unlike the U interface, the S/T bus interface, as specified by the International Telecommunications Union T Recommendation I.430 (ITU-T Recommendation I.430), and by ANSI T1.605 in North America, allows for the connection of multiple terminal equipment 204, 206 and 208 to the ISDN U interface at the customer premises, as shown in FIG. 2. The function that converts the U interface to the S/T interface is referred to as a Network Termination Type 1, or NT-1 interface device 202. Devices which perform the NT-1 function are active electronic devices.

In the United States, ISDN subscribers usually must purchase devices which provide the NT-1 function separately and configure their systems as shown in FIG. 2. Although U.S. Pat. No. 5,204,860, entitled "Network Terminating Terminal Apparatus For Integrated Services Digital Network", by Thomas C. Sparks, describes a terminal apparatus having an embedded NT-1 function which comprises a U-interface and an S/T interface. The U-interface allows the terminal apparatus to communicate with a central office, while the S/T interface allows remote terminals to be connected to the network via the S/T interface.

The S/T bus uses two wire pairs, one for transmit and one for receive. The S/T bus is synchronous, with the timing provided by the NT-1 device 202. There is also a fixed timing relationship from the NT-1 TX pair to the NT-1 RX pair. The framing is different in each direction. This allows for the NT-1's transmission of bits called E bits, which are equal in value to the corresponding D bit received by the NT-1. The physical layer signaling is such that if all TEs 204, 206 and 208 simultaneously transmitting a D bit are signaling a bit value of one, then the corresponding E bit will have a value of one; but that if one or more TEs signal a bit of value zero, the E bit will be a zero. The E bit value is therefore described as the logical AND of the bit values transmitted by all attached TEs. TEs not transmitting, with a message for transmission pending, monitor E bits; after some number of consecutive E bits of value one, the TE begins transmission.

TEs cease transmission when an E bit is received which does not match the D bit transmitted. The message transmission is attempted again after the current D channel message is completed. A collision is avoided, because the transmission of the TE that successfully completed transmission was not affected. Note that the TEs that cease transmission before the message was completely transmitted must attempt to send the same message again, and therefore must have buffered the message.

The NT-1 function allows for multiple terminal access on the D channel to the ET on a single U interface through the use of layer two addressing, and a physical layer collision-avoidance multiple access protocol that provides for the sequential transmission of messages from multiple TEs to the ET. All traffic over the D channel employs a link-layer protocol referred to as, link access protocol-D channel (LAP-D). LAP-D uses a two part address which comprises a terminal endpoint identifier (TEI) and a service access point identifier (SAPI). TEI assignment occurs either automatically when the terminal equipment is first connected, or manually by the equipment user. Automatic TEI assignment allows users to freely add or delete equipment without having to notify the network administrator that a piece of equipment has been changed.

Presently, some ISDN terminal equipment providers are producing terminal equipment with the U interface embedded in the equipment as shown in FIG. 1, allowing for the direct connection of one terminal equipment to the ISDN service. Although this is convenient for ISDN subscribers when they first subscribe to ISDN service, it has the major drawback that the use of terminal equipment having the embedded network termination function prevents the subscriber from being able to connect any additional equipment to the U interface as shown in FIG. 1.

Currently, an ISDN user would have to share the ISDN service between terminal equipment having embedded U interface terminations by manually switching the connection cable, or scraping the equipment having embedded U interfaces as shown in FIG. 1, and replacing them with an external NT-1 type device and terminal equipment having S/T bus interfaces, as shown in FIG. 2. This is not only inconvenient to ISDN subscribers, but is also a very expensive solution to those ISDN users who have made major investments in terminal equipment having embedded U interface terminations.

A need thus exists in the art for a method and apparatus which can allow for the interconnection of a plurality of TEs having embedded U interface terminations to the ISDN via a single network U interface. Specifically, a need exists in the art for a circuit or stand-alone device which can provide a network U interface connection to the local loop and several local U interface connections (also referred to as secondary U interface ports) for ISDN terminal equipment having embedded U interfaces. This circuit or device would allow for the simultaneous connection of several terminal equipment having embedded U interface network terminations to the ISDN service, thereby allowing those ISDN users having more than one terminal equipment with embedded U interface connection to simultaneously connect to the ISDN U interface.

SUMMARY OF THE INVENTION

Briefly, according to the invention, an ISDN interface circuit is comprised of a U interface for interconnecting to the ISDN and a U transceiver for transmitting messages to and receiving messages from the ISDN. The circuit also includes a plurality of secondary U interface ports for interconnecting a plurality of terminal equipment having embedded U interface terminations to the ISDN and a message buffer for buffering message transmitted by the terminal equipment prior to the messages being forwarded.

In another aspect of the invention, the circuit replaces the TEIs of messages being transmitted by terminal equipment which have manually assigned TEIs in order to avoid collisions or loss of data.

In still another aspect of the present invention a method which allows a plurality of terminal equipment having embedded U interface terminations to communicate via a single network U interface is described.

DETAILED DESCRIPTION OF THE INVENTION

Figure 3:
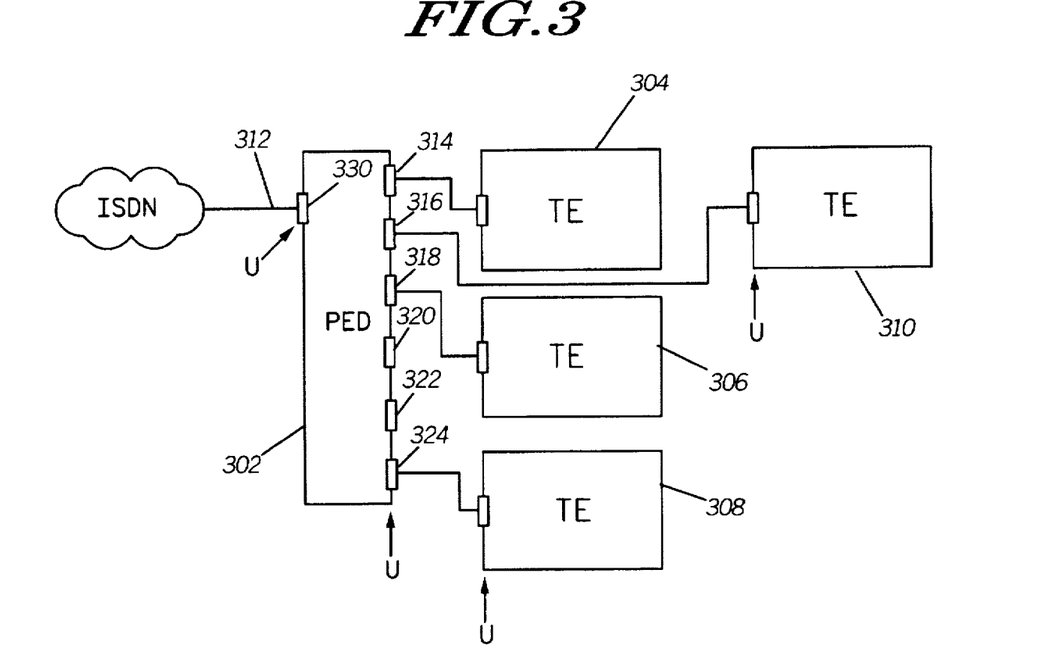
FIG. 3 shows a block diagram for an ISDN U interface port expansion device (PED) in accordance with the present invention.

Referring now to FIG. 3, there is shown a customer premises ISDN system using a U interface port expansion device (PED) 302 in accordance with the invention. PED 302 allows for a plurality of terminal equipment 304, 306, 308, 310 having embedded U interface terminations to connect to a single ISDN U interface 312. This is accomplished by PED 302 providing a network U interface connection 330 to the local loop and several local U interface connections (which will also be referred to as secondary U interface ports, $U_n'$) 314-324 for the ISDN terminal equipment having embedded U interface connections 304-310.

The PED 302 terminates the U interface of each of the attached terminals 304-310 in the same manner as would the exchange termination, were they directly attached to the U interface 312. The PED 302 further maps the terminal devices 304-310 onto the U interface 312 as if the terminals were connected as multi-dropped terminals on an S/T bus, through an NT-1 function as previously discussed.

Although the U interface has no physical layer provision for multiple TE access, the present invention provides for a device that allows for multiple TE access to the network side U interface 312 for TEs 304-310 having embedded U interface terminations.

There are two variations of the invention that address the cases that arise from the characteristics of the TE and ET, relative to TEI assignment of the TEs. Case 1 is the situation where the ET and TEs support automatic assignment of TEIs. Case 2 is where the ET supports automatic assignment of TEIs, but some (or all) TEs which are connected to the PED have fixed TEIs, and there are duplicate TEIs (i.e., at least two terminal equipment have the same TEI).

Before discussing these two special cases in-depth, a short overview of TEI assignment will first be discussed. TEIs are encoded as 7 bit binary numbers, the values of which are allocated as follows:

a. TEI values from 0 to 63, are allocated for manually assigned TEIs;

b. TEI values from 64 to 126 are allocated for automatically assigned TEIs; and c. a TEI equal to 127 is used for group assignment, or broadcast messages.

Case 1

In the situation where the ET and TEs support automatic assignment of TEIs, the PED 302 will provide unidirectional message buffering. In order to provide multiple access to the ET, LAP-D messages from the TEs on the local $U_o'$-$U_n'$ ports (secondary U interface ports) 314-324 are buffered (stored) in the PED 302 for sequential transmission on the network side U interface 312 to the ET. This is shown in simplified block diagram form in FIG. 4.

Figure 4:
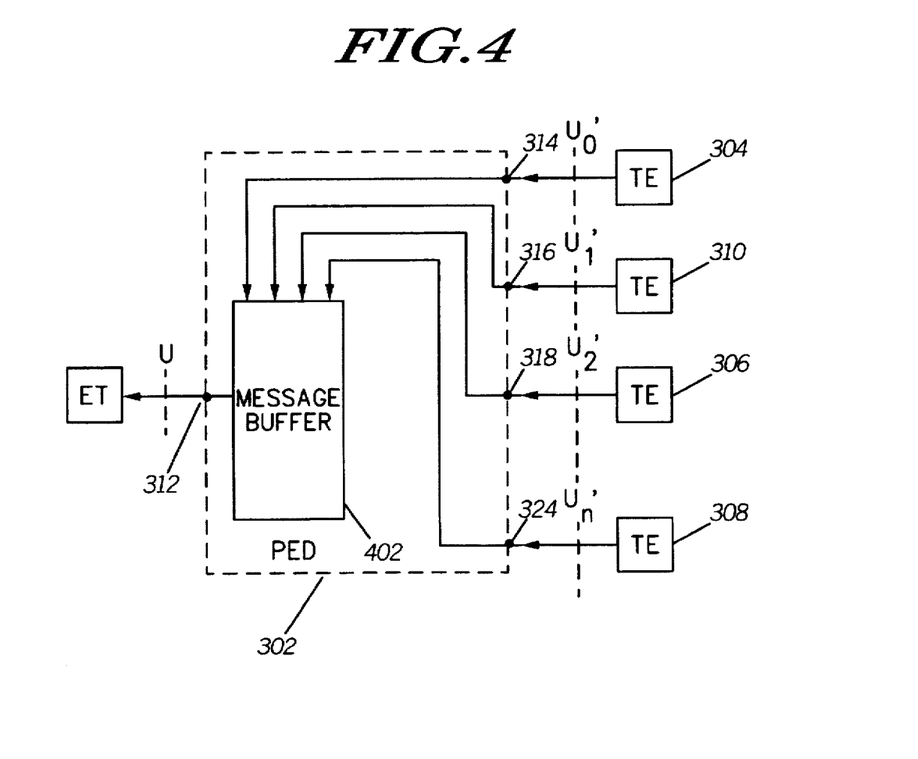
FIG. 4 shows a block diagram of a PED highlighting message buffering during TE to ET transmissions in accordance with the invention.

Multiple access to a data link message buffer 402 for the $U_n'$ interfaces 314-324 is provided and messages are dequeued from the message buffer 402 for sequential transmission to the ET. The reason messages are buffered is to allow multiple access to the U interface 312 by queuing message from the multiple TEs 304-310 for sequential transmission in the TE to ET direction.

Figure 5:
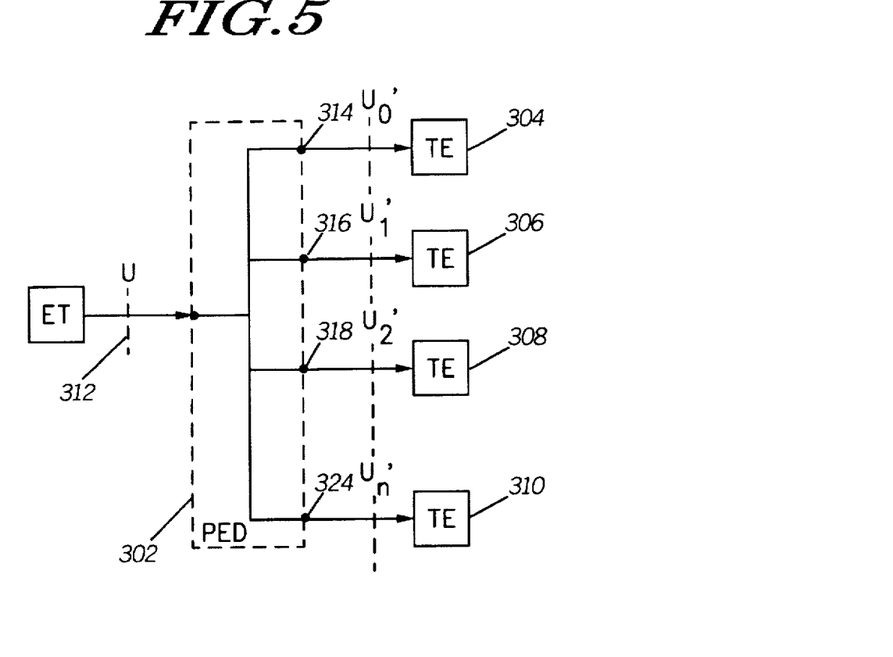
FIG. 5 shows a block diagram of a PED highlighting message transmission in the ET to TE direction in the case were all of the TEs have automatically assigned TEIs.

Messages from the ET can be routed to all local $U_o'$-$U_n'$ ports 314-324, as shown graphically in the simplified block diagram of FIG. 5. Since all the TEs 304-310 in this case support automatic assignment of TEIs, there is no contention on the D channel in the ET to TE direction, and therefore there is no need to process D channel messages. However, in the preferred embodiment described further below, D-channel messages will be processed slightly since in the preferred embodiment the D-channel messages are sent directly to the appropriate UTE port ($U_o'$–$U_n'$ ports 314–324) and not routed to all ports.

Case 2

In order to resolve the problem where more than one of the TEs 304–310 connected to the PED 302 have duplicate TEIs and the TEs 304–310 do not support automatic TEI assignment, the PED 302 will assign new TEIs on the U interface in accordance with the present invention. This problem of having duplicate TEIs can presently be very common since prior to the present invention, manufacturers of terminal equipment having embedded U interface termination's did not consider the possibility of having more than one terminal equipment connected directly to the U interface, as such, some manufacturers produce terminal equipment having the same TEI which can not be changed by the user.

In order to replace the duplicate TEIs of the TEs 304–310 connected to the PED, the messages must be altered in both the TE to ET and ET to TE transmission directions.

Figure 6:
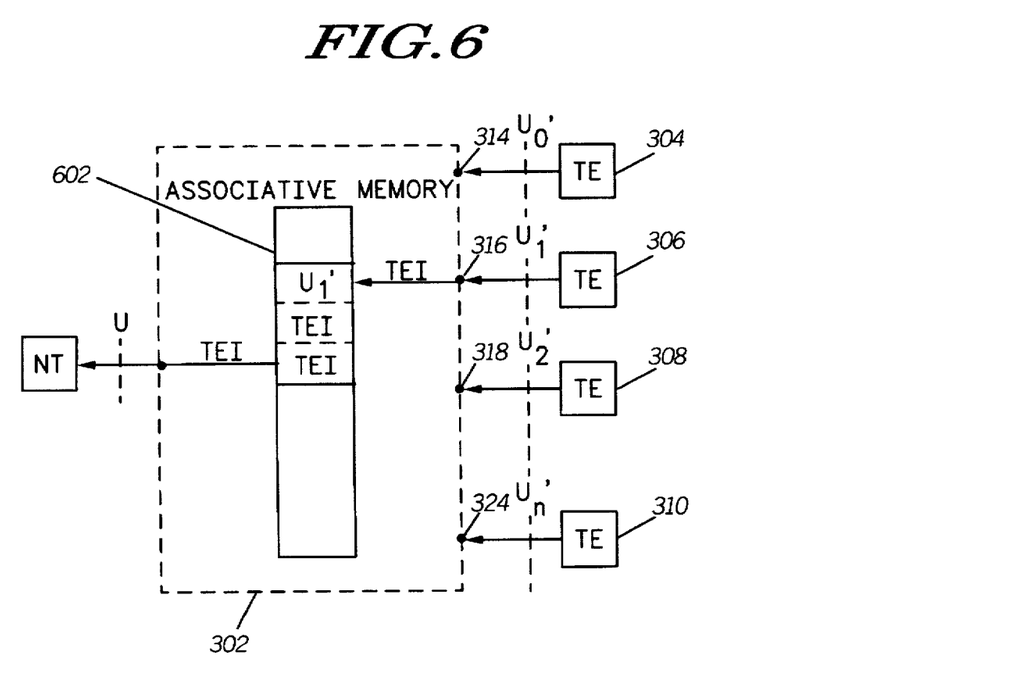
FIG. 6 shows a block diagram of a PED highlighting the TEI mapping function of the present invention during TE to ET transmissions.
Figure 7:
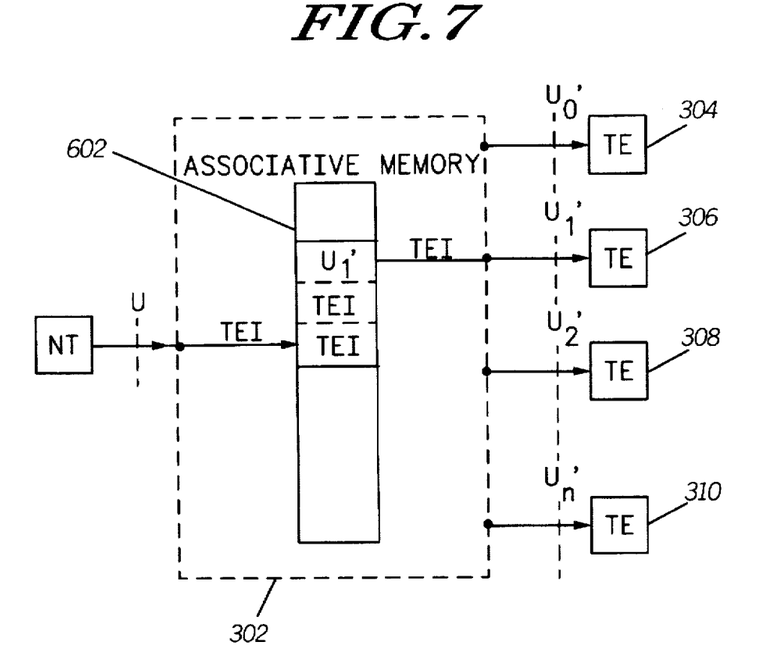
FIG. 7 shows a block diagram of a PED highlighting the TEI mapping function of the present invention during ET to TE transmissions.

When a duplicate TEI from a TE is detected, a unique TEI must be assigned by the ET. The automatic assignment protocol is used to establish the new TEI. The information relating the new TEI, old TEI, and local port number ($U_o'$–$U_n'$) 314–324 is stored in an associative memory 602 located within the PED 302, as shown in FIG. 6. This information is stored as a TEI list in memory 602. The memory 602 is indexed by new TEI in the ET to TE direction, returning old TEI and port number, and by old TEI and port number returning new TEI in the TE to ET direction. In essence, the PED 302 provides a mapping function for new TEIs in case two or more TEs coupled to the PED 302 have the same TEI assigned and they are not capable of automatic TEI assignment.

This mapping of TEIs is accomplished by the PED 302 without the TEs 304–310 which are connected to the PED 302 becoming aware of the process. After assignment of a new TEI, messages are processed by exchanging TEI values and queuing for transmission to the appropriate Un' port 314–324. As will be explained latter on below, although mapping does not have to occur unless the PED determines that a duplicate TEI situation exists, for ease of implementation, the PED in the preferred embodiment will assign a new TEI to all of the terminal equipment connected to the PED which have manually assigned TEIs.

Theory of Operation

In order to better understand the present invention, the theory of operation of the PED 302 will now be explained in detail. The theory operation will begin by explaining the operation of the PED for messages traveling from the Exchange Terminator (ET) side of the network to the plurality of terminal equipment. This will be followed by a theory of operation for message which are generated by the terminal equipment and sent to the ET.

Input Path (Messages Traveling from ET to TEs)

Figure 8:
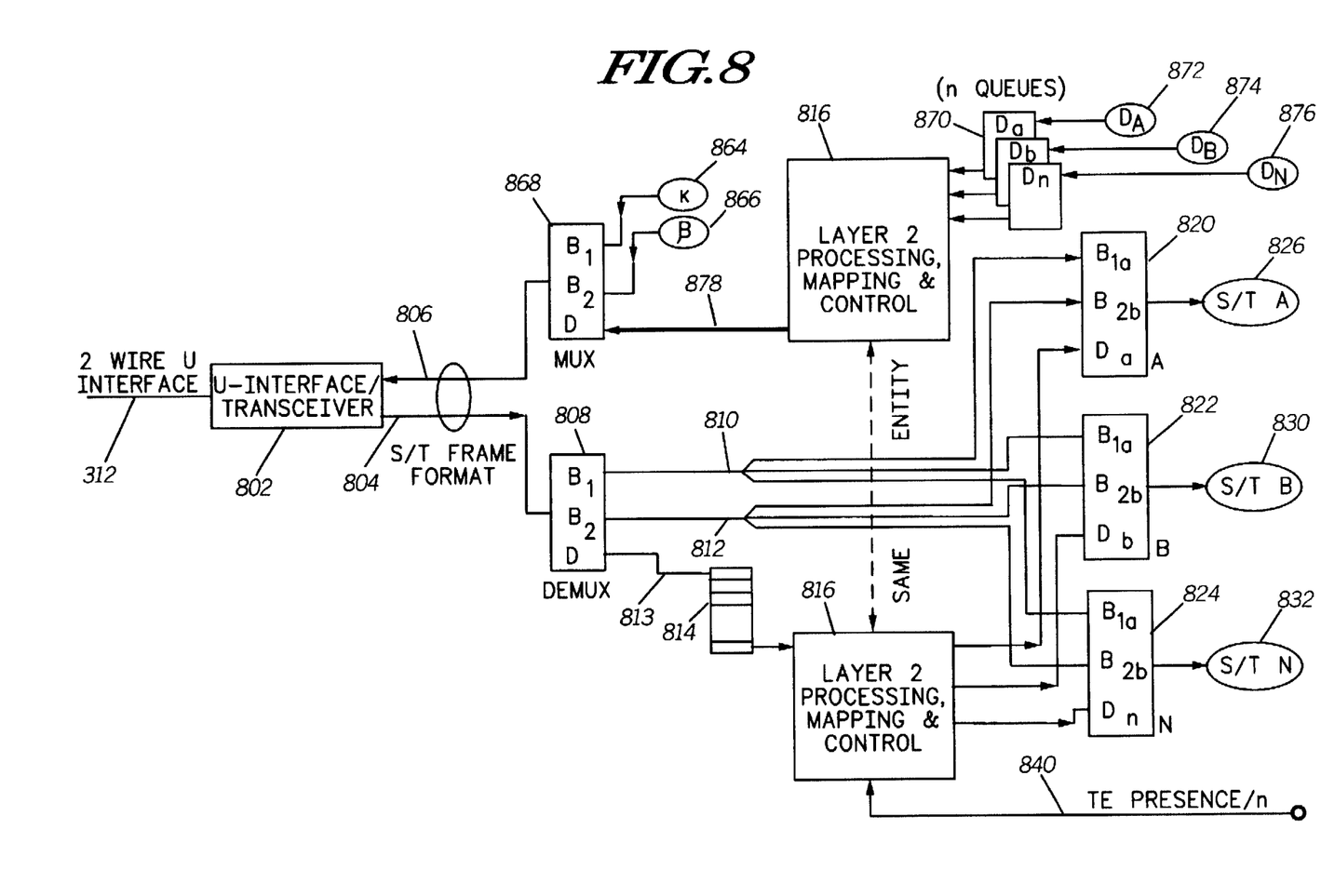
FIG. 8 shows a block diagram of a PED in accordance with the present invention.

Referring now to the data flow block diagram shown in FIG. 8, messages traveling from the telco switch, Exchange Terminator (ET) side of the network, towards the plurality of Terminal Equipment 304–310 on the 2 wire line 312, are received by a 2 wire to S/T frame format circuit 802 and separated into inbound (ET to TE) 804 and outbound (TE to ET) 806 data streams. Circuit 802 does not provide all the physical layer functionality provided by a conventional NT-1, for example, circuit 802 will not provide E bits. However, the 2 wire to S/T frame format circuit 802 will provide a conventional U interface and U-transceiver functions for extracting from the signals received an inbound data stream 804 comprising B-channel data and D-channel data.

The inbound data stream 804 is then separated into its individual components (channels), by the S-T to B1, B2 and D channel by demultiplexer 808. Channel demux block 808 performs a conventional demultiplexing function as known in the art, separating the frames into their separate channel components, B1, B2 and D channel information.

Once the component channels are separated by block 808, the B1 and B2 channels are then sent to the N-number of multiplexers 820–824 via data buses 810 and 812.

The inbound D channel messages are sent from demultiplexer block 808 to block 814 via line 813. Block 814, provides for the serial to parallel conversion of the D-channel data, LAP-D de-framing and LAP-D message queuing. Block 814 can be implemented using a conventional First-In/First-Out (FIFO) memory coupled with a shift-register providing the serial-to-parallel conversion and using appropriate control logic performed either by hardware or software. Those skilled in the art can also realize that some economies can realized from an implementation standpoint by putting most of the D channel message storage in a single physical memory arranged logically in software as n queues.

Once the D messages are queued in block 814, the messages are acted on by the Layer 2 processing, mapping and control block 816. Preferably, block 816 comprises a controller implemented using a conventional microprocessor or microcontroller executing control software which can perform the required functions. The controller 816 preferably also have overall control over the operation of the rest of the PED circuitry.

The controller 816 implements several key functions, which include:

(a). Layer 2 message processing;
   from and to the ET switch layer 2 entity; and
   from and to the TE layer 2 entities;,
(b). mapping of switch TEIs to port TEIs;
(c) Control of the D channel multiplexing/demultiplexing process; and
(d). detection and response to TE U port activity.

In it worth noting that controller 816 is shown as two separate blocks in FIG. 8 in order to simplify the overall block diagram, however both blocks are part of the same entity.

Figure 9:
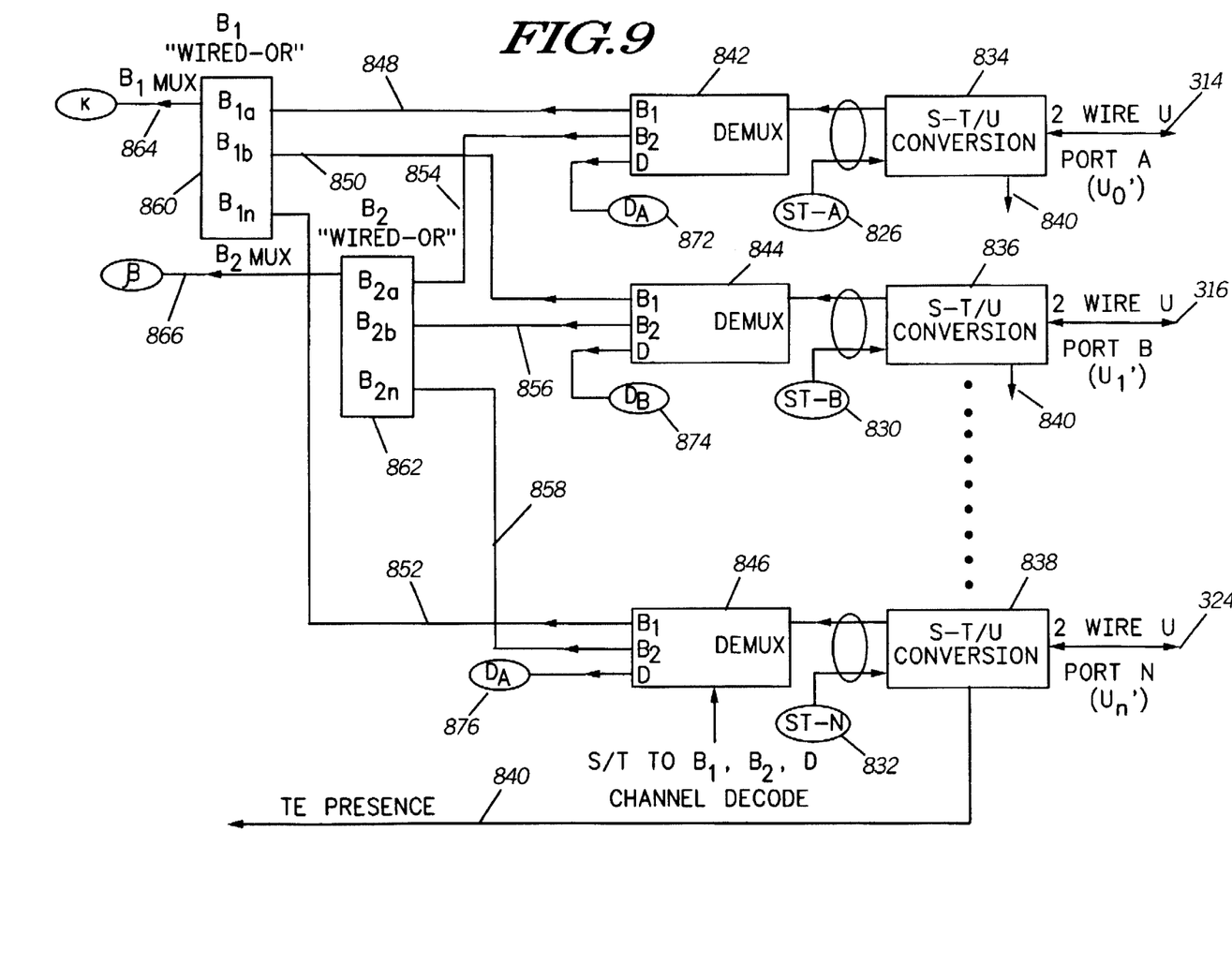
FIG. 9 is a continuation of the block diagram of FIG. 8.

Blocks 820–824 are conventional multiplexers which recombine the B1, B2, and D channels into an S-T frame format, destined for each of the end user Un' ports 314–324, which are also referred to in FIGS 8 and 9 as ports "A", "B" and "N". Although only three blocks 820, 822, 824 are shown in order to simplify FIG. 8, those skilled in the art will realize that one multiplexer block is used for each of the local Un' ports 314–324. The number of Un' ports utilized will depend on the particular design requirements of the PED being implemented.

The recombined S-T framed signals 826, 830 and 832, referred to as S/T A, S/T B and S/T N, are then sent to respective interface circuitry 834, 836 and 838 which combine the transmit and receive directions of the S-T signals into a single pair, 2-wire U interface.

Interface circuitry 834, 836 and 838 preferably also includes terminal equipment (TE) presence indication capability which causes a signal to be sent to controller 816 via the TE presence bus 840 upon the connection of a terminal equipment to any of the UTE ports 314–324. This function is preferably performed by causing a voltage level to be asserted (either high or low voltage) on the TE bus 834 for each of the Un' ports 314–324 which have a terminal equipment connected to the them. Controller 816 simply scans the TE bus 834 to determine which Un' ports 834, 836, and 838 has terminal equipment connected to them.

Output Path (Messages Traveling from the TEs to the ET)

Messages generated by the TEs which are connected to the PED are received via the 2-wire lines 314–324. The signals are then separated by blocks 834, 836, 838 which provide the same functions as block 802 which was previously discussed. The S-T/U conversion circuitry 834, 836, 838 circuitry mimics the functionality of an ET U interface. Each of the outbound data streams are then separated into their individual components (channels), by the S-T to B1, B2 and D channel decode circuitry 842,844, 846.

All of the B1 data streams 848, 850, 852 are then wired-ORed by block 860 in order to generate a single B1 signal channel 864. While all of the B2 data streams 854, 856, 858 are wired-ORed by block 862 into a single B2 signal channel 866. The combined B1 and B2 channels 864 and 866 are then coupled to the B1, B2, D channel multiplexer 868 which multiplexes the B1, B2 and D channels together.

The $D_A$ through $D_N$ outbound channels 872, 874 and 876 are buffered at block 870 in order to await processing. This block operates in the similar fashion as block 814. Block 870 can be physically implemented using a single physical memory arranged logically as n queues.

The controller 816 provides the appropriate outbound D channel via line 878 to the S-T channel encoding block (MUX) 868 which multiplexes the B1, B2, D, information into an S-T framed equivalent outbound signal 806. Operation of block 816 will be explained in detail further below. Finally, the S-T framed outbound signal 806 is sent to the 2 wire—S/T frame converter 802 which implements the appropriate S/T frame to U channel interface functions. The messages are then sent via the 2 wire line 312 to the ET.

Figure 10:
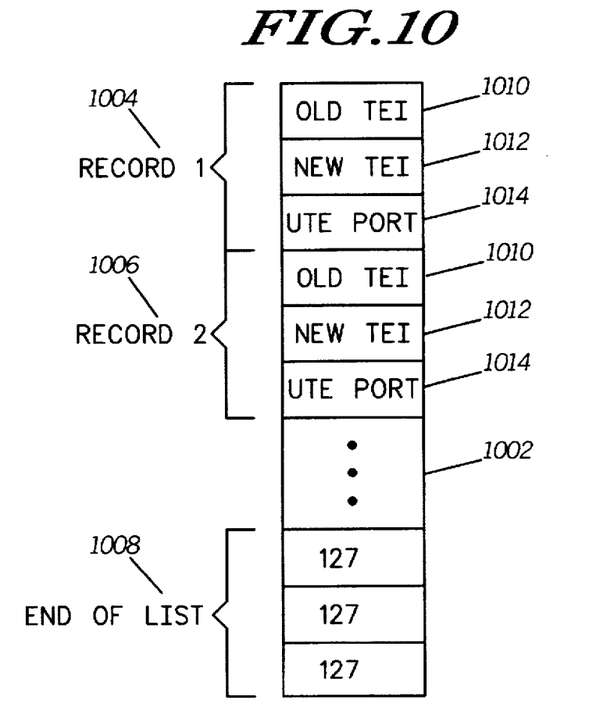
FIG. 10 is a diagram of a TEI list in accordance with the invention.

Referring now to FIG. 10, there is shown a TEI list 1002 in accordance with the present invention. The TEI list 1002 is configured as a series of records in memory. Each individual record 1004–1006 contains an "old TEI" field 1010, "new TEI " field 1012, and "UTE port number" field 1014. The end of list record 1008 is set to have its three fields equal to 127 which is the TEI number for the broadcast TEI.

In the case of TEs which are coupled to one of the local UTE ports (314, 316, 324) and are capable of automatic TEI assignment, the TEI once assigned by the exchange termination, will be loaded into the old TEI field for that particular TE. Also, the old TEI field will be set equal to the new TEI field and the particular port number will be loaded into the UTE port field 1014 for that particular data record.

In the case of TEs which are coupled to the PED 302 and are only capable of manually assigned TEIs, the TEI which is presently assigned to the TE is loaded in the old TEI field 1010 and the port number the TE is connected to is loaded in the UTE port field 1014. As will be explained below, the PED 302 will then assign a new TEI to that particular TE and load this new TEI in the new TEI field 1012 for that particular record. Since TEs are allowed to have more than one TEI, in the case more than one TEI is assigned to a TE, separate records will be created in the TEI list for each TEI.

Figure 11:
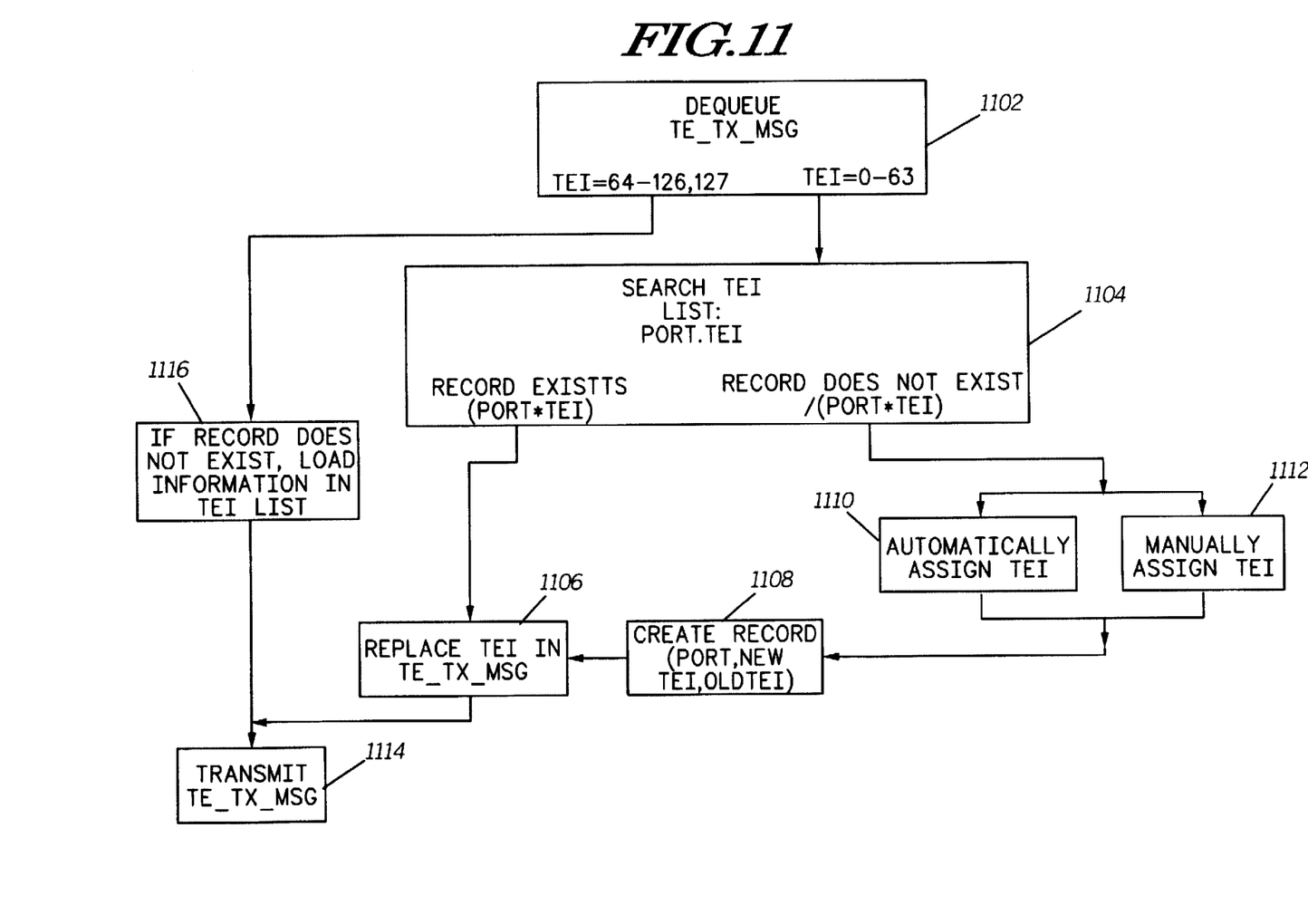
FIG. 11 is a flow diagram showing the steps taken by the PED when preparing messages for transmission in accordance with the preferred embodiment.

In FIG. 11, the steps taken by the PED 302 when messages are being transmitted by TEs (also referred to as UTEs) connected to the PED 302 towards the TE is shown. In step 1102, a message which has been temporarily stored in block 870 (see FIG. 8) after being transmitted by one of the TEs (304–310) is removed from storage (dequeued), and the TEI of the TE which transmitted the message is determined. If the TEI is between the values of 64–126 or equal to 127, denoting that the TE supports automatic TEI assignment (TEI =64–126) or that the message is a broadcast message in the case the TEI is equal to 127, the automatically assigned TEI is loaded into the TEI list in step 1116.

In step 1116 the automatically assigned TEI is loaded into both the new and old TEI fields 1010 and 1112 and the UTE port number(314–324) that the TE is connected to is loaded into the UTE port field 1014. This process creates one record that can be later searched. It is worth mentioning that in the situation where the TE has more than one TEI assigned to it, the process will generate a new record for each TEI. After the TEI list is updated, the message is then transmitted in step 1114 through the ISDN.

If the TEI is determined to be between 0–63 in step 1102, denoting a TE which has a manually assigned TEI, the TEI list is searched by comparing this TEI with all of the old TEI fields 1010, to determine if a record already exists for that particular TEI. If a record exists for that TEI, the PED will then replace the TEI in the queued message in step 1106 with the value in the new TEI field 1012 for that particular TE. Finally in step 1114, the message is transmitted with the new TEI information.

If in step 1104, it is determined that a record for that particular TEI does not presently exist in the TEI list 1002 (i.e., no matching TEI in the old TEI fields 1010), the PED 302 can either manually assign a new TEI as shown in step 1112, or request for an automatic assignment of a TEI from the ET in step 1110, or do a combination of both in the event either the automatically assignable TEIs or manually assignable TEIs have been all used up.

In the preferred embodiment, the PED 302 will only support the automatic assignment routine (step 1110 is implemented instead of step 1112). When using the automatic assignment routine of step 1110, once it is determined in step 1104 that a record for that particular TEI does not already exist in the TEI list, the controller 816 will automatically cause an automatic TEI assignment message to be transmitted requesting that a TEI be assigned by the exchange termination. Once the newly assigned TEI is received, it is loaded into the new TEI field 1012 in the TEI list. Also, the UTE port number for that particular TE is loaded into the UTE port field 1014 and the old TEI field 1010 is loaded with the TEI value presently manually assigned to the TE in step 1108. In step 1106, the TEI in the dequeued message from block 870 is replaced with the newly assigned TEI (new TEI loaded in the new TEI field 1012) prior to the message being transmitted in step 1114.

The above process prevents the situation where two or more TEs which have manually assigned TEI's are connected to the PED and have duplicate TEIs. Note that although in the preferred embodiment the controller 816 automatically requests a new TEI for all TEs (304–310) which have manually assigned TEIs, the routine could be modified to only have controller 816 request a new TEI when a duplicate TEI is detected.

In a second embodiment, instead of having controller 816 request an automatically assignable TEI from the ET, if manual assignment is supported (step 1112 instead of step 1110 is supported), once it is determined that a particular TEI does not presently exist in the TEI list 1002, the PED will look for the lowest TEI number between 0–63 which is currently not in use by searching all of the old TEI fields 1010 in the TEI list 1002 and assigning the lowest available TEI number as the new TEI number in step 1108. The new TEI number is assigned by inserting this TEI into the new TEI field 1012 for that particular record. After the new record is created, in step 1106, the TEI in the message to be transmitted is replaced with the new TEI number prior to the message being transmitted in step 1114. Again as above the old TEI field 1010 is loaded with the original TEI and the UTE port number for that particular TE is loaded in the UTE port field 1014.

In a more sophisticated implementation, the PED could support both automatic TEI assignment, step 1110, and manual TEI assignment, step 1112. This could be used in a PED implementation where more than 63 ports would be in use. Once all of the automatically assignable TEIs (TEI= 64-126) had been used up, the PED could automatically switch into using the manual assignment routine of step 1112, thereby allowing for more TEI number assignments.

Those skilled in the art will realize that the algorithm in FIG. 11 can be implemented in several different ways. For example, instead of always reassigning a TEI in steps 1110 or 1112, the present manually assigned TEI could be maintained as long as their are no other TEs having the same TEI assignment connected to the PED 302. In this particular situation the old TEI and new TEI fields 1010 and 1012 would be set equal to each other and a new TEI would only be chosen if another TE had a TEI equal to any of the old TEI fields 1010 found in the TEI list.

Figure 12:
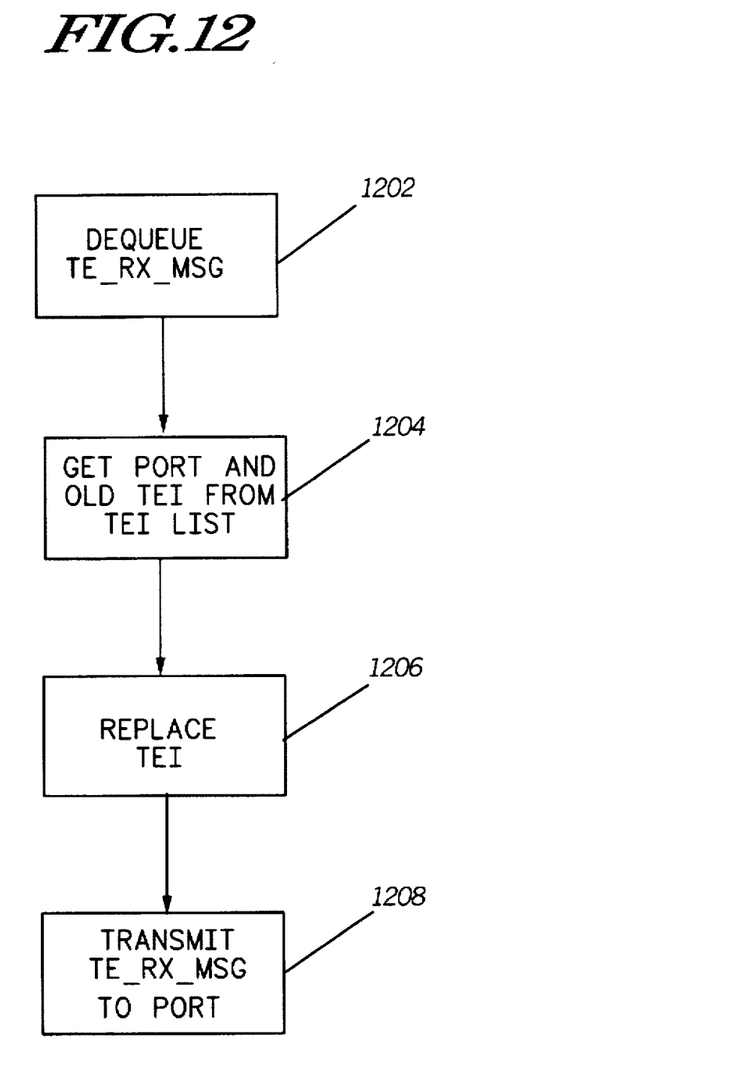
FIG. 12 is a flow diagram showing the steps taken by the PED when receiving messages directed to one of the TEs coupled to the PED in accordance with the present invention.

In FIG. 12, there is shown the routine taken by the controller 816 when D-channel messages have been received by the PED 302 and are presently queued in memory block 814 ready to be forwarded to TEs coupled to the PED 302. In step 1202, if a D-channel message is presently queued in memory block 814, it is removed from the queue. In step 1204, the layer 2 processing block 816 runs through the TEI list 1002 and locates the record who has a new TEI field 1012 which is equal to the TEI of the D-channel message which has been dequeued. Once a match is found, the port number field 1014 and old TEI field 1010 information are extracted in step 1204. The layer 2 processing block 816 then replaces the current TEI found in the dequeued D-channel message with the TEI value found in the old TEI field 1010 if required in step 1206. Once the TEI is replaced, in step 1208, the D-channel message (referred to as TE_RX_MSG) in the flowchart is forwarded to the multiplexer (820–824) which corresponds to the local U interface port number (314–324) gathered in step 1204. This allows for the correct TE to receive the incoming message.

As been shown for incoming messages, the PED 302 remaps the TEI information and provides the message to the appropriate TE coupled to the PED 302. The remapping routine prevents any collisions from occurring if more than one TE coupled to the PED has the same manually assigned TEI. Since manually assigned TEIs are replaced using the mapping technique of the preferred embodiment, collisions and loss of data due to two or more TEs having the same TEI being connected to the PED 302 are eliminated.

Figure 13:
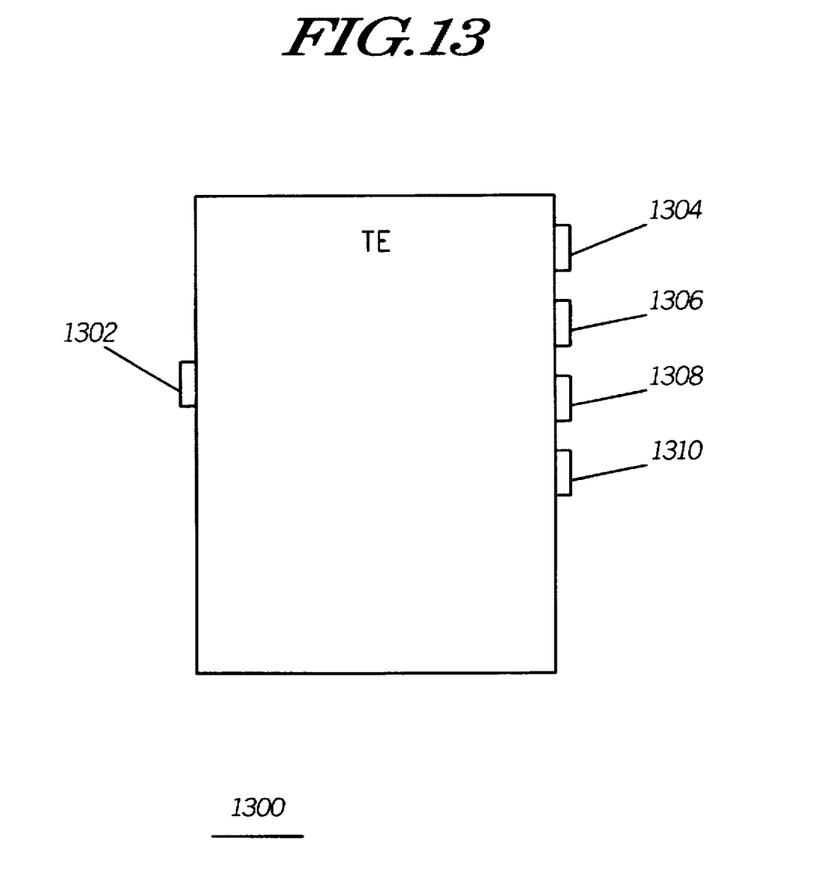
FIG. 13 shows a terminal apparatus having the PED circuitry of the present invention.

Referring now to FIG. 13, there is shown a terminal apparatus 1300 having a network U interface connector 1302 for connection to the ISDN and a plurality of local U interface connectors 1304–1310 which allows for other terminal equipment to interconnect to the ISDN via the network U interface connector 1302 in accordance with the present invention.

While the present invention has been described in conjunction with specific embodiments, it is evident that many alternatives, modifications and variations will be apparent to those skilled in the art in light of the foregoing description. For example, the PED 302 can take the form of circuitry which can be embedded into a terminal apparatus instead of taking the form of a stand-alone device. Accordingly, it is intended that the present invention embrace all such alternatives, modifications and variations as fall within the broad scope of the appended claims.

What is claimed is:

1. A circuit which allows for the interconnection of a plurality of terminal equipments each having an embedded U interface termination to an Integrated Services Digital Network (ISDN), the circuit comprising:
   a network U-interface for connection to the ISDN;
   a U-transceiver for transmitting signals to, and receiving signals from, the ISDN via the U-interface;
   a plurality of local (secondary) U-interface ports which allow for the interconnection of the plurality of terminal equipments having embedded U interface terminations to the ISDN; and
   a message buffer coupled to the plurality of secondary U-interface ports for queuing messages transmitted by the plurality of terminal equipments prior to the messages being transmitted by the U-transceiver.

2. A circuit as defined in claim 1, wherein the circuit comprises a stand-alone device.

3. A circuit as defined in claim 1, wherein the circuit is embedded in a terminal apparatus.

4. A circuit as defined in claim 1, wherein if more than one message is stored in the message buffer, the message buffer provides the messages sequentially to the U-transceiver for transmission.

5. A circuit which allows for the interconnection of a plurality of terminal equipments each having an embedded U interface termination to an Integrated Services Digital Network (ISDN), the circuit comprising:
   a network U-interface for connection to the ISDN;
   a U-transceiver for transmitting signals to, and receiving signals from, the ISDN via the U-interface;
   a plurality of local (secondary) U-interface ports which allow for the interconnection of the plurality of terminal equipments to the ISDN;
   a message buffer coupled to the plurality of secondary U-interface ports for queuing messages transmitted by the plurality of terminal equipments prior to the messages being transmitted by the U-transceiver; and
   wherein all of the plurality of terminal equipments have a terminal equipment identifier (TEI) and at least one of the terminal equipment from amongst the plurality of terminal equipments has a manually assigned TEI and the circuit further comprises:
   a controller coupled to the message buffer for mapping a new TEI to the at least one terminal equipment having a manually assigned TEI.

6. A circuit as defined in claim 5, wherein the controller maps a new TEI to the at least one of the plurality of terminal equipment having a manually assigned TEI by transmitting via the U-interface transceiver an automatic TEI assignment request and upon receiving the automatically assigned TEI linking the automatically assigned TEI to the manually assigned TEI.

7. A circuit as defined in claim 5, wherein the controller maps a new TEI to the at least one of the plurality of terminal equipment having a manually assigned TEI by selecting a new TEI by determining the lowest manually assignable TEI that is currently not in use and assigning that TEI as the new TEI.

8. A circuit as defined in claim 6, wherein the controller replaces the manually assigned TEI with the automatically assigned TEI whenever a message transmitted by the at least one of the plurality of terminal equipment having a manually assigned TEI is located in the message buffer ready for transmission to the ISDN.

9. A circuit as defined in claim 6, wherein each of the plurality of local U-interface ports has a port number assigned to it and the controller links the port number of each of the plurality of local U-interface ports to the TEI assigned to the terminal equipment connected to each of the plurality of local U-interface ports.

10. A method for allowing a plurality of terminal equipments each having an embedded U-interface termination to interconnect to an Integrated Services Digital Network (ISDN) via a single network U-interface, comprising the steps of:

(a) buffering messages transmitted by the plurality of terminal equipments having embedded U-interface terminations prior to sending the messages to the ISDN;

(b) sequentially transmitting via the single network U-interface the buffered messages to the ISDN;

(c) receiving messages from the ISDN via the single network U-interface which are being sent to particular ones of the plurality of terminal equipments;

(d) determining for which of the plurality of terminal equipments the messages received in step (c) are directed; and (e) providing the messages received in step (c) to those of the plurality of terminal equipments determined in step (d).

11. A method for allowing a plurality of terminal equipments having embedded U-interface ports to interconnect to an Integrated Services Digital Network (ISDN) via a single network U-interface, comprising the steps of:

(a) buffering messages transmitted by the plurality of terminal equipments prior to sending the messages to the ISDN;

(b) sequentially transmitting via the single network U-interface the buffered messages to the ISDN;

(c) receiving messages from the ISDN via the single network U-interface which are being sent to particular ones of the plurality of terminal equipments;

(d) determining for which of the plurality of terminal equipments the messages received in step (c) are directed;

(e) providing the messages received in step (c) to those of the plurality of terminal equipments determined in step (d); and wherein for each of the messages which are received in step (c), step (d) comprises:
 determining a terminal endpoint identifier (TEI) for the received message; and
 comparing the TEI with a list of records indexed by the TEI assigned to each of the plurality of terminal equipments.

12. A method as defined in claim 11, wherein the plurality of terminal equipments are connected to specifically numbered local U-interface ports, and step (d) further comprises:

determining the number of the local U-interface port that the terminal equipment for which the received message is directed to is connected and forwarding the received message in step (c) to the local U-interface port having that port number.

13. A method for allowing a plurality of terminal equipments having embedded U-interface terminations to receive messages from an Integrated Services Digital Network (ISDN) via a single network U-interface, comprising the steps of:

(a) buffering messages which are received via the network U-interface;

(b) selecting one of the buffered messages;

(c) determining the value of a terminal equipment identifier (TEI) found in the selected message;

(d) searching a TEI list until a record having a field which matches the TEI value determined in step (c) is located;

(e) determining from the located record a corresponding old (actual) TEI value;

(f) replacing the TEI value determined in step (c) with the old TEI value found in step (e); and (g) forwarding the selected message.

14. A method as defined in claim 13, wherein step (g) comprises forwarding the selected message to a terminal equipment from among the plurality of terminal equipments which has an assigned TEI value equal to the old TEI value.

15. A method as defined in claim 13, wherein step (g) comprises forwarding the selected message to the plurality of terminal equipments and the method further comprises:

(a) decoding the selected message by a terminal equipment from among the plurality of terminal equipments which has an assigned TEI value equal to the old TEI value.

16. A method as defined in claim 13, wherein the TEI value determined in step (c) is equal to the value of the old TEI value determined in step (e) for those terminal equipments from among the plurality of terminal equipments which are capable of automatic TEI assignment.

17. A method for allowing a plurality of terminal equipments having embedded U-interface terminations to transmit messages to an Integrated Services Digital Network (ISDN) via a single network U-interface, comprising the steps of:

(a) buffering messages which are transmitted by the plurality of terminal equipments;

(b) determining a terminal equipment identifier (TEI) value found in one of the messages which has been buffered;

(c) forwarding the message for which the TEI has been determined in step (b) via the network U-interface to the ISDN if the TEI value determined in step (b) relates to a terminal equipment which is capable of automatic TEI assignment;

(d) searching a TEI list for a record which has a TEI value which matches the TEI value found in step (b), if it is determined that the TEI value found in step (b) relates to a terminal equipment which is capable of manually assignable TEIs;

(e) determining from the record located in the search conducted in step (d) a corresponding new TEI value;

(f) replacing the TEI value determined in step (b) with the new TEI value; and (g) forwarding the message via the network U-interface to the ISDN.

18. A method as defined in claim 17, wherein if a matching TEI value is not found in step (d) after searching the TEI list, then the method comprises the further steps of:

(h) transmitting a message requesting that a new TEI value be assigned;

(i) receiving a new TEI value via the U-interface; and (j) performing steps (f) and (g).

19. A method as defined in claim 17, wherein if a matching TEI value is not found in step (d) after searching the TEI list, then the method comprises the further steps of:

(h) choosing a new TEI value which is presently not in use and which corresponds to TEI values which are assigned to manually assignable TEIs; and (i) performing steps (f) and (g).

* * * * *